Figure 1:
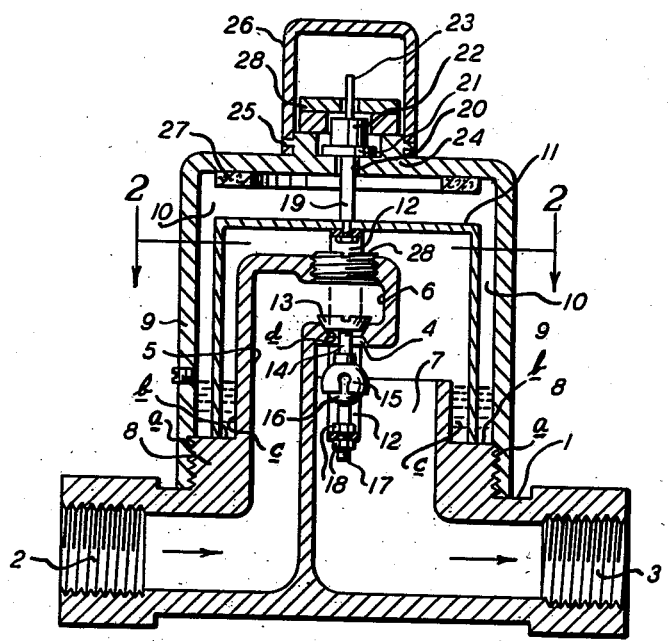

Dec. 23, 1941.   W. B. WALTERS   2,266,943
GAS CONTROL VALVE
Filed March 6, 1939

WALTER B. WALTERS.
INVENTOR

BY Cecil L. Wood
ATTORNEY

Patented Dec. 23, 1941

2,266,943

UNITED STATES PATENT OFFICE 2,266,943

GAS CONTROL VALVE

Walter B. Walters, San Antonio, Tex.

Application March 6, 1939, Serial No. 260,087

1 Claim. (Cl. 50—6)

This invention relates to valves of the type generally employed for the purpose of regulating the flow of gas or liquid through a service line where it is necessary or desirable to automatically shut off or minimize such flow and it has particular reference to an automatic regulator and shut-off valve for gas of an inflammable character used for fuel, and the like, and its principal object resides in the provision of a valve embodying a combination of elements calculated to shut off the flow of fluid through the service line from the source to the appliance when such source has been dissipated prior to shutting off the said appliance thereby preventing the renewal of the passage of the fluid through the service line to the appliance after such flow has been interrupted.

A further object of the invention is manifest in the provision of an interrupter or shut-off valve adapted to be installed in a service line used for the supply of fuel gas produced from a natural source, such as a gas well, or the like, container for coal gases, supply tanks, such as commonly employed for the storage of fuel gas now widely used for both commercial and domestic purposes in rural and suburban areas where utility connections are not readily available and where a hazard prevails by reason of the limited supply of the fuel in storage and where it becomes necessary to replenish such supply at more or less regular intervals by refilling or interchanging the drums or tanks in which the fuel is compressed or stored.

Yet another object of the invention resides in the provision of a valve of the character described comprising an assembly including a pressure actuated valve element which normally retains the closure in open position allowing the passage of the fluid through the valve to the appliance while the latter is lighted or unlighted or while the service valve on the appliance is open, permitting the closure to close only when the supply is interrupted from the source or through the valve from the inlet or outlet side thereof.

An important object of the invention is that of providing a valve which is automatic in its operation and capable of not only shutting off the flow of fuel gases when the source is dissipated but which will operate to interrupt the passage through the line of such gases from the source when the connection between the valve and the appliance is disconnected or becomes ruptured whereby the gas is dissipated before reaching the appliance. In other words, should the usual flexible connection be broken or accidentally removed from the appliance, the valve herein described will automatically shut off the flow of gas through the service line preventing an otherwise dangerous condition.

A still further object of the invention is manifest in the provision of adjustments controlling the relative displacement of the closure element with respect to its seat providing a regulating medium by which the passage of fluid through the assembly may be adequately controlled enabling the consumer to properly regulate the pressure passing through the service line to the appliance thereby preventing an abnormal flow of the fuel causing an undesirable fluctuation or variation in the burner flame of the appliance.

Broadly, the invention seeks to comprehend the provision of a control valve assembly adapted to minimize or negative the hazard commonly attendant upon the use of combustible gases for fuel in domestic appliances by controlling or regulating the flow of such fuel through the service line to the appliance or by positively shutting off such flow when the source is depleted or the outer connection is ruptured or disconnected to be manually opened to permit a resumption of the supply of the fuel from the source when the latter has been replenished and to prevent such resumption when the service valve on the appliance is left open after the source is exhausted.

Figure 2:
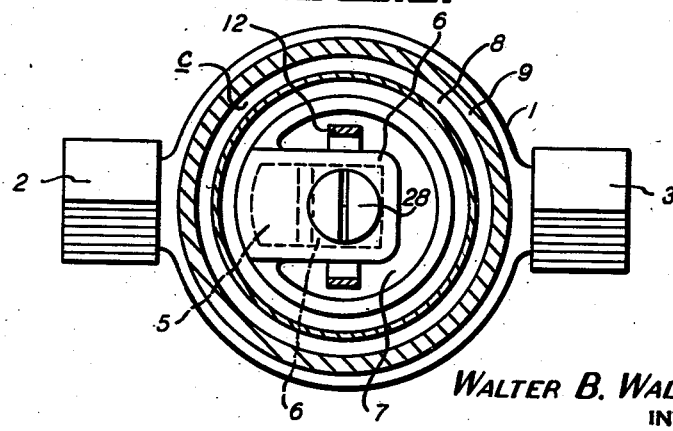

While the foregoing objects are paramount, other and lesser objects will become manifest as the description proceeds taken in connection with the accompanying drawing wherein:

Figure 1 is a vertical cross-sectional illustration of the invention showing the inlet and outlet passages and the closure for the communication therebetween and illustrating the inverted cup diaphragm operating the said closure, and Figure 2 is a lateral cross-section taken on lines 2—2 of Figure 1.

The invention herein described may be so constructed as to be adapted to use in connection with any type of gas, whether the same be liquified petroleum gases of the type ordinarily used for domestic and commercial fuels, such as in household installations, or commercial connections for supplying fuel for firing boilers, or the like, and may be readily adapted to use in connection with high pressure lines employed in refineries or other installations where various types of gas are compressed such as may be employed for refrigeration, carbonation, and the like, and may even extend to acetylene welding equipment. In fact, the device herein described comprehends a combination of elements contemplated to be adapted to the control of fluids conventionally employed for fuel utilized in any known scope of domestic or commercial adaptation.

Accordingly, therefore, the invention is primarily comprised of a main body casting 1 having an inlet passage 2 and an outlet passage 3, as illustrated in Figure 1, having a communication 4 therebetween. The body member 1 is so constructed as to define a throat passage 5 extending from the inlet passage 2 and terminating within the chamber 6 through the bottom of which the communication 4 is arranged. A well 7 is defined within the body member 1 immediately beneath the communication 4 and forms a continuation of the outlet passage 3.

The body member 1 is so formed as to define a circular threaded shoulder 8 which receives a housing 9 providing a chamber 10 therein. The housing 9 is preferably cup-shaped and inverted and threaded to the member 1 at $a$ upon the threaded shoulder 8 of the member 1.

In Figure 2 the well 7 is shown to be substantially circular and the throat passage 5 extends thereinto while the chamber 6 projects laterally from the throat 5 over the well 7. The throat 5, the chamber 6 and the well 7 are integral with the body member 1 and preferably cast together.

The well 7 is formed on the body member 1 in such a manner as to provide a shoulder $b$ therearound and consequently defines an annular receptacle $c$ externally of the well 7 and within the walls of the housing 9 when the latter is adjusted in the manner illustrated in Figure 1. An inverted cup 11 is arranged within the housing 9, its lower end adapted to repose within the annular receptacle $c$ and in concentric relationship to the well 7. The inverted cup 11, hereinafter referred to as a diaphragm, is connected through the medium of a yoke 12 to a closure 13 adapted to engage the seat $c$ through the communication or aperture 4 between the passages 2 and 3. The closure 13 is threaded upon the upper end of a stem 14 whose lowermost end is provided with a socket 15 receiving a ball coupling 16 integral with a downwardly projecting stem 17 which is connected through the medium of lock nuts 18 which latter afford an adjustment for the stem 17 with respect to the yoke 12 carrying the same.

The yoke 12 is secured to the under side of the top of the diaphragm 11 through the medium of a stem 19 which projects upwardly from the diaphragm 11 through an aperture 20 in the top of the housing 9 and whose upper end is provided with an integral flange 21, a head portion 22 of lesser diameter than the flange 21 and an integral pin 23, the purpose of the last named members being hereinafter described more in detail.

An integral annular boss 24 is formed atop the housing 9 and is provided with integral lugs 25 which are received by slots (not shown) in the lowermost rim of a cap 26 which is attached to the housing 9 around the boss 24 by what is commonly referred to as a bayonet joint, or by any conventional method of attachment which may be considered convenient and expedient.

As previously stated, the herein described invention is designed for the purpose of regulating and interrupting the flow of gas through the service line in which it is installed, such installations being made between the source and the appliance through which the fuel is consumed. The purpose, therefore, of the diaphragm 11 and the closure 13 is that of shutting off or restricting the passage of gas between the inlet passage 2 and the outlet passage 3 hereinbefore mentioned. Obviously, while the closure 13 is in engagement with the seat $d$ in the communication 4 between the passages 2 and 3 gases will not pass through the assembly but when the cap 26 is removed and the diaphragm 11 and the closure 13 are raised through the medium of the stem 19 by grasping the upwardly projecting pin 23 integral with the upper end thereof gas pressure entering the inlet passage 2 will pass through the communication 4 and out through the outlet passage 3, the pressure traveling through the assembly building up within the diaphragm 11 and acting thereupon to retain the same in an uplifted or floating position maintaining the closure 13 off its seat $d$ and permitting the continuous flow of gas through the valve.

A quantity of liquid, such as mercury, or the like, of a character suitable for the purpose, is disposed within the annular receptacle $c$ surrounding the well 7 affording a seal around the lowermost rim of the diaphragm 11 which, as previously described, extends downwardly into the receptacle $c$. Thus, as the fluid passes through the assembly a pressure will be maintained within the diaphragm raising the same a predetermined distance, depending upon the volume or the said pressure, and maintaining the closure 13 off its seat $d$. The pressure within the diaphragm 11 will remain constant so long as the connection between the valve and the appliance is not broken or disconnected and so long as the pressure at the source remains constant.

However, should the source pressure vary, that is, should it increase or decrease, the diaphragm 11 will be moved proportionately and in the event an excess pressure prevails at the source the diaphragm 11 will be raised against the sealing ring 27 fixed to the under side of the top of the housing 9 and which will prevent the passage of the sealing liquid within the annular receptacle $c$ from being expelled by such excess pressure through the aperture 20 in the top of the housing 9 surrounding the stem 19 which projects therethrough.

While it is contemplated that all gas pressures from the source, once predetermined, will remain constant it is very probable that such pressures will vary and therefore present a problem which must be met and consequently controlled. The upper end of the stem 19 projecting through the top of the housing 9 has been previously described as having an annular flange 20, a head member 22 and an upwardly projecting pin 23. This assembly is so designed as to provide a governor arrangement for the diaphragm 11 which consists of a series of weights 28 of different sizes which may be picked up successively by the head member 21 and the flange 20 as the stem 19 is raised by the gas pressures beneath the diaphragm 11. Any number of the weights 28 may be supplied and any form of the integral portions of the upper end of the stem 19 may be employed to successively engage and pick up the said weights, only two of which are herein shown and described.

The closure 13, by reason of its peculiar shape, is adapted to engage the seat $d$ in the aperture 4 at any angle and to seek its seat automatically.

This is expedited through the provision of the ball and socket connection 15 and 16 with the supporting stem 17 which in turn is connected through the lock nuts 18 to the yoke 12 which is secured to the diaphragm 11. The movement of the closure 13 may be controlled by adjusting the same through the lock nuts 18 on the stem 17 to effect the proper closing of the aperture 4.

In providing a regulator or control medium for the flow of gas through the service line the pressure on the outlet side of the assembly through the outlet passage 3 balanced through the action of the velocity of the fluid through the valve acting upon the closure 13 and the member 15 as it flows through the aperture 4. When the pressure exceeds a predetermined value on the outlet side of the aperture 4 and within the diaphragm 11 the member 15 is drawn upwardly against the lower side of the seat d in the aperture 4 restricting the further passage of the fuel therethrough allowing the diaphragm 11 to descend to the proper level to afford a maximum clearance through the communication 4. Therefore, a constant pressure is maintained on each side of the valve element. The pressure of only a very few ounces is ordinarily the maximum required for domestic consumption but such pressures may be very much greater depending upon the use for which the device is employed, that is, whether it be employed for the regulation and control of gases utilized for domestic or commercial fuels or whether the same be employed for the purpose of controlling the flow of gases under pressure in refineries, or the like.

In operation, therefore, the fluid enters the valve through the inlet passage 2 and passes upwardly through the throat 5 into the chamber 6. Obviously, while the closure 13 rests upon the seat d the passage of the fluid is arrested and cannot reach the appliance through the outlet passage 3. When the cap 26 is removed, however, and the closure 13 is raised from its seat by manually operating the stem 19, which operation also raises the diaphragm 11, the flow of the gas will proceed through the communication 4 into the diaphragm 11 and out through the well 7 and the outlet passage 3 to the appliance, and such flow will continue due to the pressure within the diaphragm 11 which buoys the same holding the closure 13 off its seat d, the liquid seal around the lowermost rim of the diaphragm 11 in the annular receptacle c preventing the pressure from escaping from within the diaphragm 11 and, although fluid may be expelled from the receptacle c, such liquid cannot be expelled from the housing 9 by reason of the circular sealing ring 27 within the top of the said housing 9.

Should the volume pressure of the gas be abnormally increased for any reason the member 15 opposite the closure 13 on the stem 14 will restrict the aperture 4 sufficiently to prevent such excess pressure affecting the appliance through the passage 3 and maintain a substantially constant pressure on the discharge side of the valve within the diaphragm 11, the operation of both the closure 13 and the member 15 with respect to the seats d of the communication 4 being determined by the adjustment provided through the medium of the lock nuts 18 on the lowermost end of the stem 17. The closure 13 may be inserted through the chamber 6 and positioned within the aperture 4 through an opening closed by a plug 28 threaded therein in the top of the chamber 6.

Conventional methods of attaching appliances to service lines include, in some instances, a flexible connection such as a rubebr hose, or the like, whose ends are pressed on over nozzles integral with petcocks or valves secured to the ends of service lines and to the appliances. Such connections are often hazardous due to accidental disconnection or leakage and it is desirable to provide such a valve as herein described to automatically shut off the passage of such gases when the connections referred to are broken.

Naturally, the pressures on the outlet side of the valve will be rapidly dissipated allowing the diaphragm 11 to descend suddenly closing the valve by seating the closure 13 in the aperture 4 requiring the manual manipulation of the same, in the manner previously described, to again open the said valve for the resumption of the interrupted flow. Thus, the assembly presents both shut-off and pressure control medium eliminating many ordinary dangerous hazards.

Although the invention has been described with great particularity, it is obvious that certain changes and modifications in structure and design may be resorted to by those skilled in the art and such changes and modifications which may be resorted from time to time and which may be considered within the spirit and intent of the invention may also be considered as falling within the scope of the appended claim.

What is claimed is:

In a valve for regulating gas pressures including a body having inlet and outlet chambers, a communication between the said chambers and a valve element adapted to close the said communication, a threaded shoulder on the upper portion of the said body, a hood adapted to be secured to the said shoulder enclosing the said valve and forming a sealing chamber, an upwardly projecting portion of the said body defining a well and a part of the said outlet chamber, an annular receptacle formed between the said well and the walls of the said hood upon the said shoulder, a sealing liquid in the said receptacle, an inverted cup enclosing the said valve within the said hood and having its lower rim extending into the said receptacle and the said liquid, a yoke member providing a flexible connection between the said cup and the said valve, by reason of a ball and socket structure at its juncture with the latter, whereby the latter is actuated by pressures exerted within the said cup and the said outlet chamber.

WALTER B. WALTERS.